United States Patent
Nieuwenhuis

(10) Patent No.: US 11,359,957 B2
(45) Date of Patent: Jun. 14, 2022

(54) MODULAR SENSOR SYSTEM AND USE OF THE MODULAR SENSOR SYSTEM IN A SLATTED FRAME MATTRESS

(71) Applicant: LAROMED GMBH, Schleswig (DE)

(72) Inventor: Günter Nieuwenhuis, Weilerswist (DE)

(73) Assignee: LAROMED GMBH, Schleswig (DE)

( * ) Notice: Subject to any disclaimer, the term of this patent is extended or adjusted under 35 U.S.C. 154(b) by 123 days.

(21) Appl. No.: 16/474,293

(22) PCT Filed: Dec. 21, 2017

(86) PCT No.: PCT/EP2017/083985
§ 371 (c)(1),
(2) Date: Jun. 27, 2019

(87) PCT Pub. No.: WO2018/122085
PCT Pub. Date: Jul. 5, 2018

(65) Prior Publication Data
US 2019/0339114 A1    Nov. 7, 2019

(30) Foreign Application Priority Data

Dec. 27, 2016 (DE) .................. 10 2016 015 449.7
Dec. 27, 2016 (DE) .................. 20 2016 007 965.5

(51) Int. Cl.
*G01G 19/52* (2006.01)
*G01G 21/23* (2006.01)
*G01G 19/44* (2006.01)
*G01L 1/16* (2006.01)

(52) U.S. Cl.
CPC ........... *G01G 19/52* (2013.01); *G01G 19/445* (2013.01); *G01G 21/23* (2013.01); *G01L 1/16* (2013.01)

(58) Field of Classification Search
CPC ........ G01L 1/16; G01G 19/52; G01G 19/445; G01G 21/23; G01G 3/13; G01G 3/14; G01G 3/1418
See application file for complete search history.

(56) References Cited

U.S. PATENT DOCUMENTS 4,363,368 A * 12/1982 Paddon ................ G01G 19/445
                                                        177/144
4,539,560 A *  9/1985 Fleck .................... A61B 5/1115
                                                        177/144
(Continued)

FOREIGN PATENT DOCUMENTS

CH           706013         7/2013
DE          3936788         5/1991
(Continued)

OTHER PUBLICATIONS

Official Action with machine translation for German Patent Application No. 102016015449.7, dated Jun. 16, 2017, 4 pages.
(Continued)

*Primary Examiner* — Randy W Gibson
(74) *Attorney, Agent, or Firm* — Sheridan Ross P.C.

(57) ABSTRACT

The invention relates to a modular sensor system consisting of at least three modules with at least one sensor, at least one sensor carrier and at least one weight distribution strip, which can be connected to each other in a sandwich-like manner. The modular sensor system can be used in a slatted frame mattress.

15 Claims, 26 Drawing Sheets

(56) References Cited

U.S. PATENT DOCUMENTS

Figure 1:
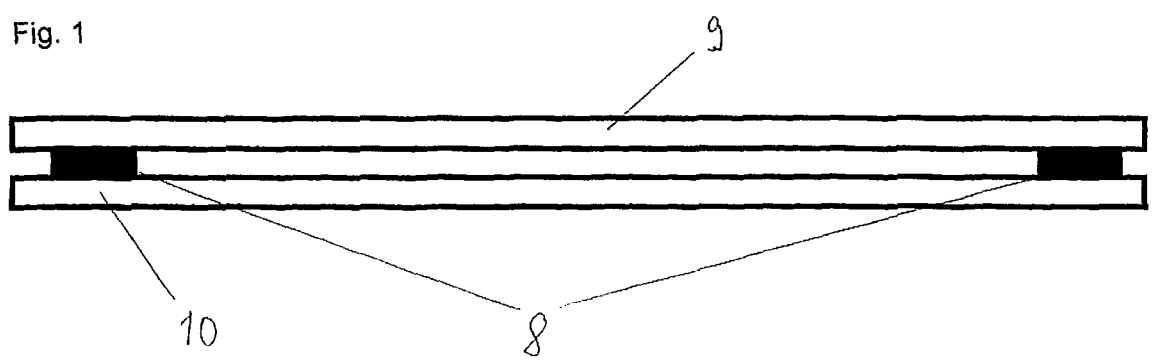

| | | | | |
|---|---|---|---|---|
| 5,265,481 | A | * | 11/1993 | Sonderegger ............ G01G 3/13 |
| | | | | 177/21 OC |
| 5,461,924 | A | * | 10/1995 | Calderara ................ G01G 3/13 |
| | | | | 73/768 |
| 5,501,111 | A | * | 3/1996 | Sonderegger ............ G01G 3/13 |
| | | | | 29/25.35 |
| 5,780,781 | A | * | 7/1998 | Berger ................. G01G 19/445 |
| | | | | 177/126 |
| 6,093,895 | A | * | 7/2000 | Niosi ................. G01G 23/3728 |
| | | | | 177/136 |
| 6,680,442 | B1 | * | 1/2004 | Rynd ................. G01G 19/445 |
| | | | | 177/140 |
| 7,069,610 | B1 | | 7/2006 | Chai |
| 9,304,032 | B2 | * | 4/2016 | Cornu ....................... G01L 1/04 |
| 10,378,974 | B2 | * | 8/2019 | Pfluger .................... G08G 1/02 |
| 2006/0162074 | A1 | | 7/2006 | Bader |
| 2015/0128353 | A1 | | 5/2015 | Kildey |
| 2016/0150299 | A1 | | 5/2016 | Gilberton et al. |

FOREIGN PATENT DOCUMENTS

| | | |
|---|---|---|
| DE | 69834044 | 8/2006 |
| DE | 102008031043 | 12/2009 |
| DE | 102010021363 | 12/2011 |
| WO | WO 2013/003963 | 1/2013 |
| WO | WO 2013/003964 | 1/2013 |

OTHER PUBLICATIONS

Official Action with machine translation for European Patent Application No. 17832227.7, dated Jun. 2, 2021, 8 pages.

International Search Report and Written Opinion for International (PCT) Patent Application No. PCT/EP2017/083985, dated Apr. 24, 2018, 11 pages.

Official Action for German Patent Application No. 102016015449.7, dated Jun. 16, 2017, 2 pages.

* cited by examiner

Fig. 19
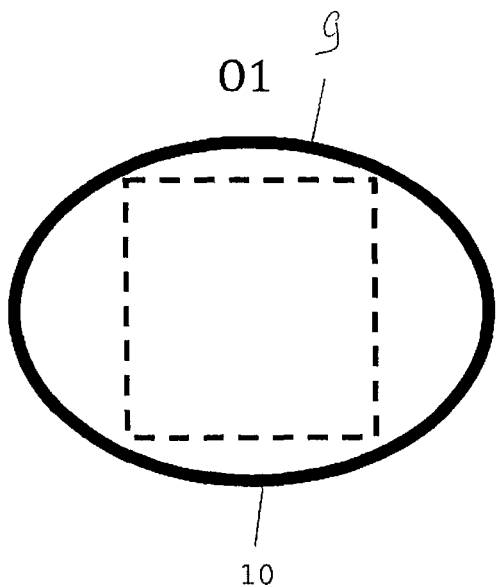
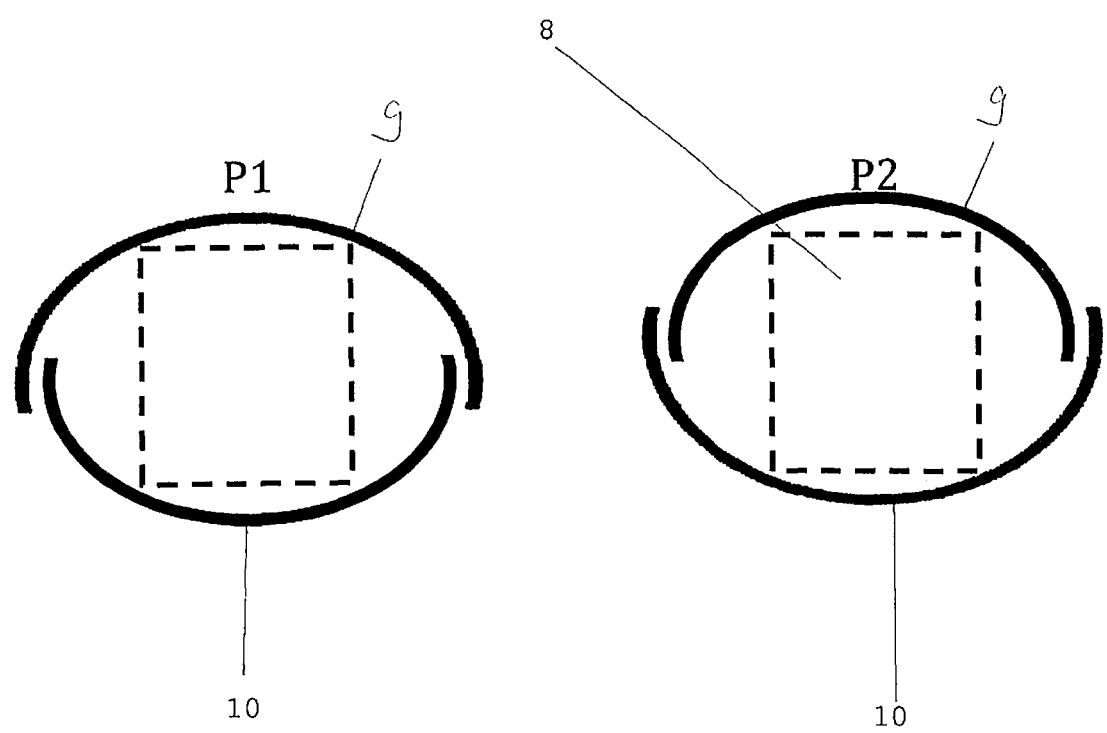

16

Prior Art

Prior Art

MODULAR SENSOR SYSTEM AND USE OF THE MODULAR SENSOR SYSTEM IN A SLATTED FRAME MATTRESS

CROSS REFERENCE TO RELATED APPLICATIONS

This application is a national stage application under 35 U.S.C. 371 and claims the benefit of PCT Application No. PCT/EP2017/083985 having an international filing date of 21 Dec. 2017, which designated the United States, which PCT application claimed the benefit of German Patent Application No. 10 2016 015 449.7 filed 27 Dec. 2016 and German Patent Application No. 20 2016 007 965.5 filed 27 Dec. 2016, the disclosures of each of which are incorporated herein by reference in their entireties.

The entire content of priority applications DE 20 2016 007 965.5 and DE 10 2016 015 449.7 is herewith incorporated into the present application by reference.

The invention relates to a modular sensor system, in particular for use in a slatted frame mattress, in accordance with the preamble of the independent claim.

The inventive modular sensor system consists of at least three modules sandwiched together in a plane and having at least one sensor carrier, at least one sensor, preferentially a load cell sensor having at least one weight distribution strip.

The sensor is directly coupled to the weight distribution strip and the coupling forms the measuring or respectively sensor points depending on the parameters to be measured, e.g. at points, planar and/or raised.

Structuring the system of the individual modules in one plane achieves a very flat design which corresponds in geometry and function to the known slats of a slatted frame or the slats of a slatted frame mattress respectively and can replace same through simple replacement.

It is thereby possible to easily replace existing slats in mattress systems or respectively entire slatted frames in conventional systems with the inventive modular sensor system, which can also ensue individually or in groups, at any time, even without the use of tools. Combining existing slats with the modular sensor system is likewise easily configurable.

The respective sensors at the measuring points, preferentially for weight, temperature, moisture, acceleration and/or determining spatial positioning, are coupled to a smart beacon device (SBD), e.g. also with ultra-wideband (UWB), WLAN, Bluetooth or other wireless technology with suitable frequencies, or same is integrated into the sensor or, respectively, the sensor is integrated into the smart beacon device (SBD).

Understood as such smart beacon devices (SBD) within the meaning of the invention are communication units able to build a bidirectional digital communication infrastructure and construct intermeshed networks in conjunction with a gateway, for example by means of wireless Bluetooth Low Energy, same also able to connect to the internet via the gateway. Each SBD can send and receive data and collect, store, process and transmit information by means of I/O ports/interfaces.

In the modular sensor system according to the invention, at least one SBD can be coupled to the sensor or respectively integrated into same in order to collect, store and process sensor information on weight, temperature, moisture, acceleration and/or measuring point-related spatial positional data in conjunction with the intermeshed network and transmit it for example to a central data processing and control unit.

In the sense of the invention, coupling is understood as the electrical, electronic and/or electromagnetic connecting of the respective sensor to scannable parameters in analog and/or digitized form.

In the sense of the invention, integrating is understood as the constructive structural connection or coupling of the respective sensor to the SBD, whereby in the best case scenario no redundant components are required.

By using suitable sensor modules, at least the following measurements can thereby be made with the inventive modular sensor system:

Weight measurement as point measurement, linear measurement, area measurement.

Acceleration measurement as point measurement, linear measurement, area measurement.

Temperature measurement as point measurement, linear measurement, area measurement.

Moisture measurement as point measurement, linear measurement, area measurement.

Spatial position measurement as point measurement, linear measurement, area measurement.

The measurements are made in situ, sequentially or continuously, also in combination. The measurements themselves are regulatable or controllable. As actuators, the measuring parameters are capable of regulating or controlling themselves. The linking of defined measurement events of the inventive modular sensor system to multimedia systems such as image, video or the like, supplements the invention's possibilities.

SBDs can communicate with each other as well as also with the internet via the intermeshed network. The inventive modular sensor system thus also meets the demands posed by the "internet of things."

Statistical analyses, trend analyses, pattern recognition and big data analyses are thus feasible when using the inventive modular sensor system. Programming thereby enables all user-specific control and/or regulation data to be collected, processed, documented, coded if necessary, and made available to authorized users for retrieval via a portal or known communication channels.

Due to its low energy consumption, an SBD in stand-alone operation can interact with a battery charge for a very long period of time—many months to years—and is thus in particular suitable for wireless use.

The inventive modular sensor system offers further possibilities here of ensuring virtually "lifelong" operation of sensors and SBDs. Since the inventive modular sensor system is inherently designed to also extract small amounts of electrical energy for energy harvesting through the active measuring of parameter changes such as e.g. weight, temperature, moisture and/or acceleration, the inventive modular sensor system can simultaneously assume the energy supplying of one/its/multiple SBDs. This can ensue for example by tapping sensor energy as an energy converter temporarily not switched into measuring mode.

Thus, a simple, universally utilizable modular sensor system of very flat design is provided, with which even commonplace slats in a slatted frame can be replaced.

For physical considerations, such an inventive modular sensor system which measures parameters such as, for example, weight, temperature, moisture, acceleration and/or measuring point-related spatial positioning data in conjunction with the intermeshed network, should be placed as close as possible to the body of one to be measured without thereby compromising their resting comfort. Therefore, use in a slatted frame mattress is preferentially recommended.

The slatted frame in a prior art slatted frame mattress rests on two longitudinal lateral pedestals and the person lies directly on the slats atop only a thin overlay. Unlike conventional beds, in which a mattress lies on a separate slatted frame having a rigid frame, wherein the slatted frame is usually fixed directly to the frame, the body profile and body weight in the slatted frame mattress is directly transferred from the overlay to the lateral pedestals by the individual slats forming the slatted frame with the mattress. The slatted frame can thus closely assume the shape of the body profile.

The structural features of the slatted frame mattress shown in DE 39 36 788 C2 and DE 10 2008 031 043 A1 therefore offer the possibilities of body-accurate measurement with the inventive modular sensor system rather than customary slatted frames with separate mattresses in which the body's proximity to the slats, which are replaced by the inventive modular sensor system, depends on the thickness of the mattress.

A sensor slatted frame for a slatted frame mattress is known from the prior art in DE 10 2010 021 363 A1 which is structurally superior to common pressure mats made from a foil material because it supports long-term use and moisture-wicking. It thereby relates to a flexible, body-close sensor slatted frame for slatted frame mattresses having a thin overlay in order to detect, for example, pressure, moisture and temperature of bedridden persons. However, the pressure, moisture, temperature and distance sensors are thereby individually positioned on the respective slats or the pedestals of the slatted frame mattress respectively.

The invention is based on the task of providing a modular sensor system which, in addition to the original function as "slat," enables measuring physiological functions, detection, e.g. presence, monitoring e.g. parameter changes and/or position determination.

A further task is that of providing a modular sensor system which is easily, quickly, easily-serviceably and economically introducible into an existing bed, preferentially a bed with a slatted frame mattress.

This task is solved by the inventive apparatus according to claim 1 and the configurations according to the dependent claims.

In claim 1, the inventive apparatus claims a modular sensor system consisting of at least three modules having at least one sensor, at least one sensor carrier and at least one weight distribution strip which can be connected to each other in a sandwich-like manner.

The use of the modular sensor system in a slatted frame mattress is further claimed.

On the whole, the invention provides a multifunctional modular sensor system which can be easily and reliably integrated even into existing systems with little installation effort.

Known materials such as aluminum, steel, wood, PVC, fiber-reinforced plastic and/or composites can be used in combination for the sensor carrier and weight distribution strip modules.

The simple geometry to the structural design enables it to be easily integrated or retrofit into existing systems without any difficulty.

Further advantages, features and possible applications of the present invention will become apparent from the following description in conjunction with the figures. Shown are:

FIG. 1 a first exemplary structural implementation of the inventive modular sensor system in sectional side view.

Figure 2:
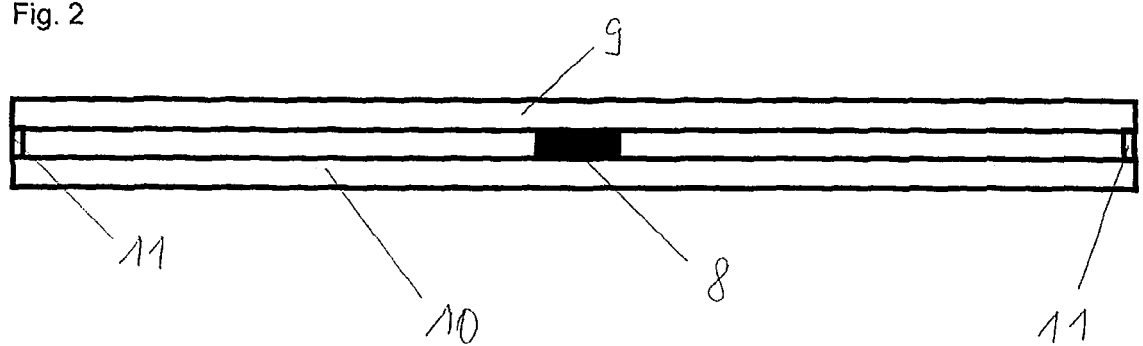

FIG. 2 a second exemplary structural implementation of the inventive modular sensor system in sectional side view.

Figure 3:
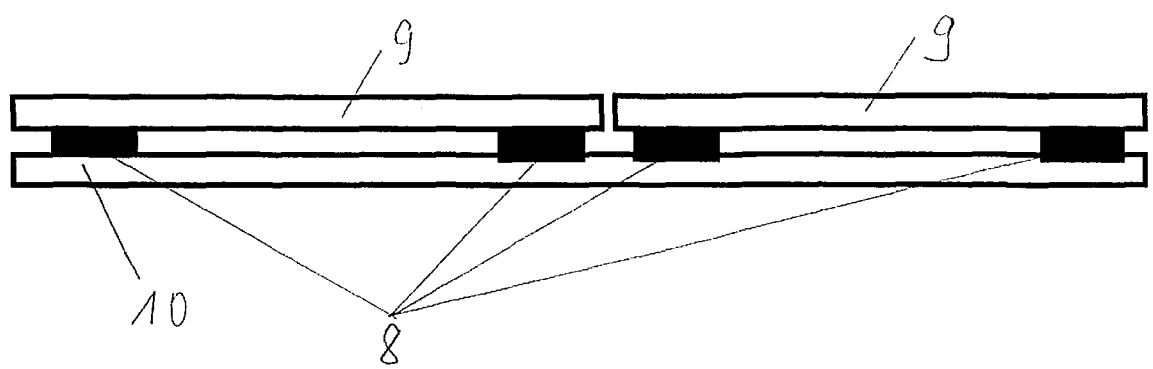

FIG. 3 a third exemplary structural implementation of the inventive modular sensor system in sectional side view.

Figure 4:
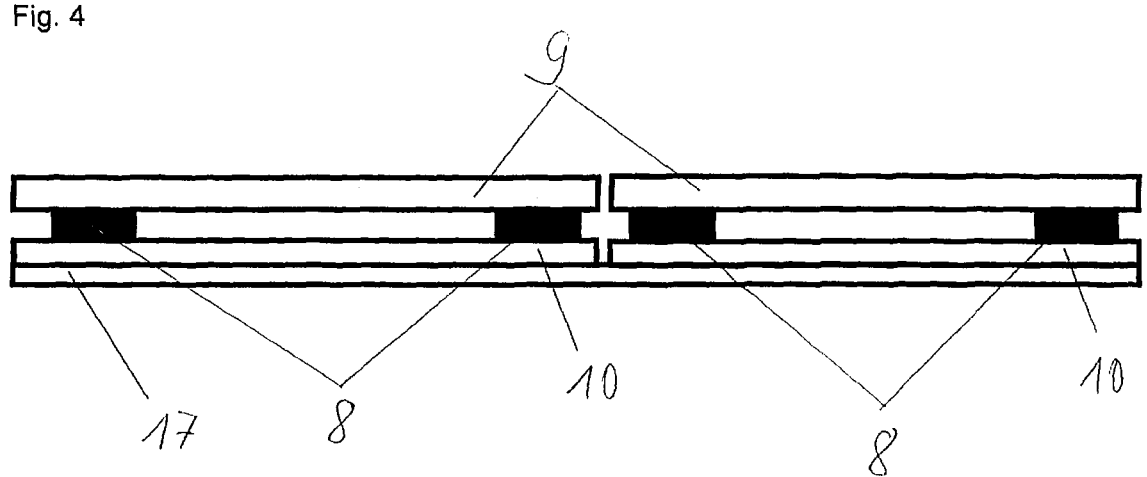

FIG. 4 a fourth exemplary structural implementation of the inventive modular sensor system in sectional side view.

Figure 5:
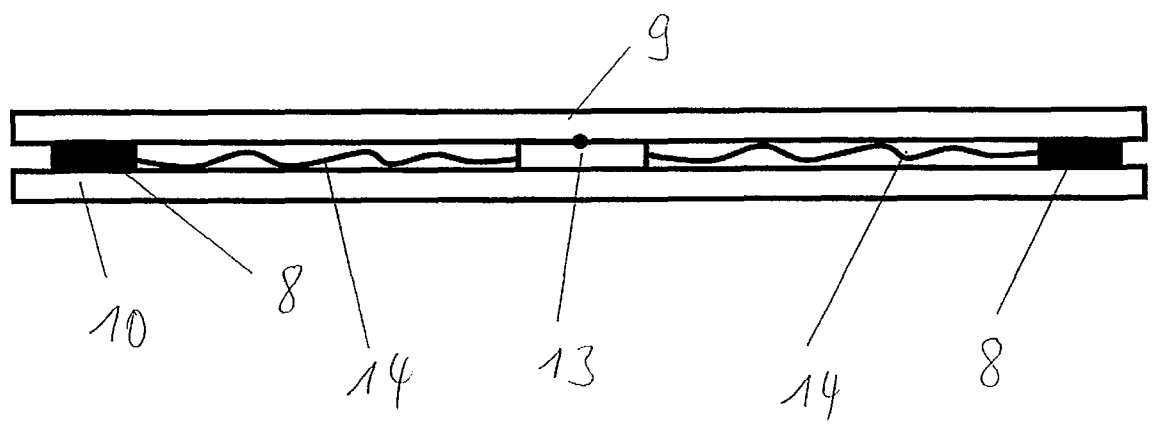

FIG. 5 a first exemplary structural implementation of the inventive modular sensor system in sectional side view as per FIG. 1 with coupled smart beacon device (SBD).

Figure 6:
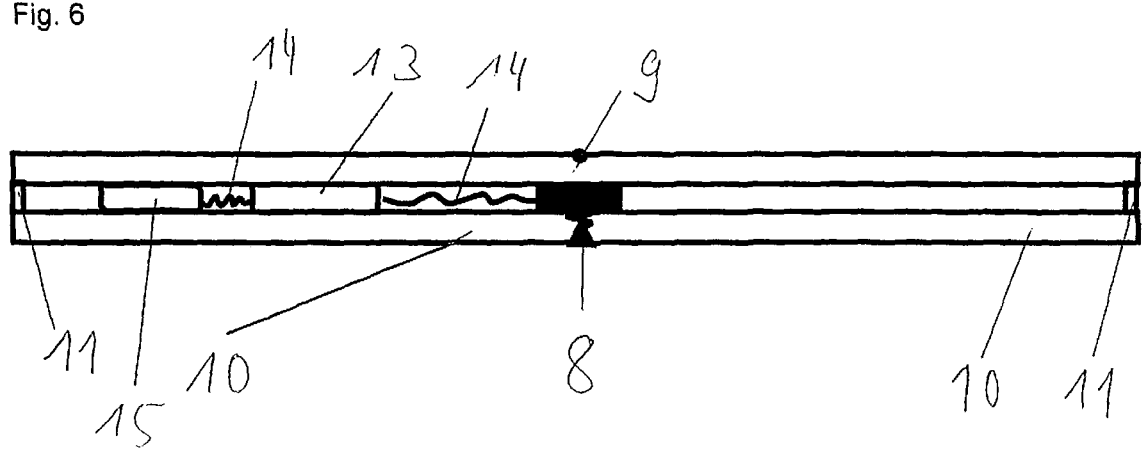

FIG. 6 a second exemplary structural implementation of the inventive modular sensor system in sectional side view as per FIG. 2 with coupled smart beacon device (SBD) and an internal power supply.

Figure 7:
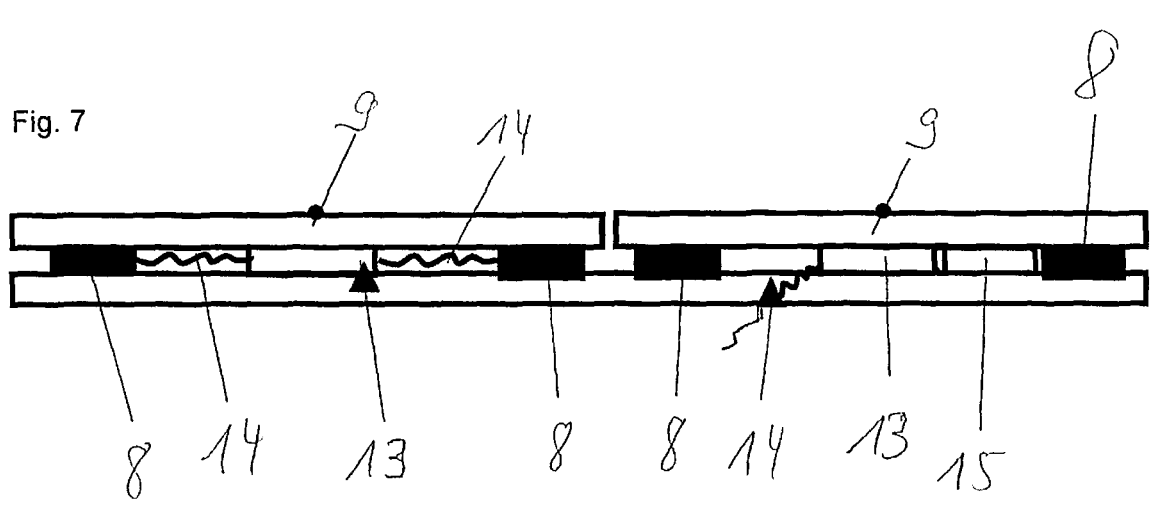

FIG. 7 a third exemplary structural implementation of the inventive modular sensor system in sectional side view as per FIG. 3 with respective coupled smart beacon devices (SBD) and an internal power supply.

Figure 8:
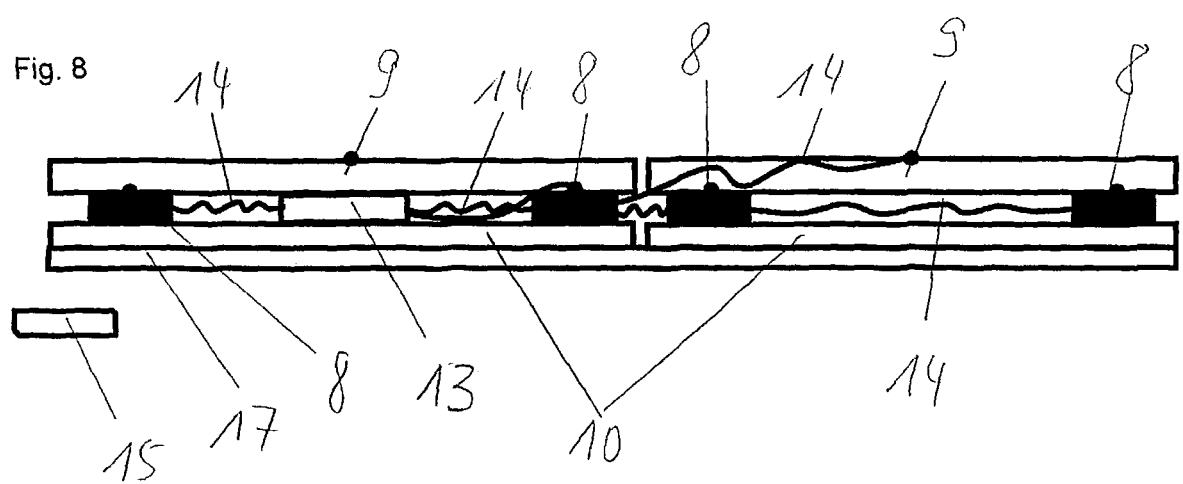

FIG. 8 a fourth exemplary structural implementation of the inventive modular sensor system in sectional side view as per FIG. 4 with respective coupled smart beacon devices (SBD) and an external power supply.

Figure 9:
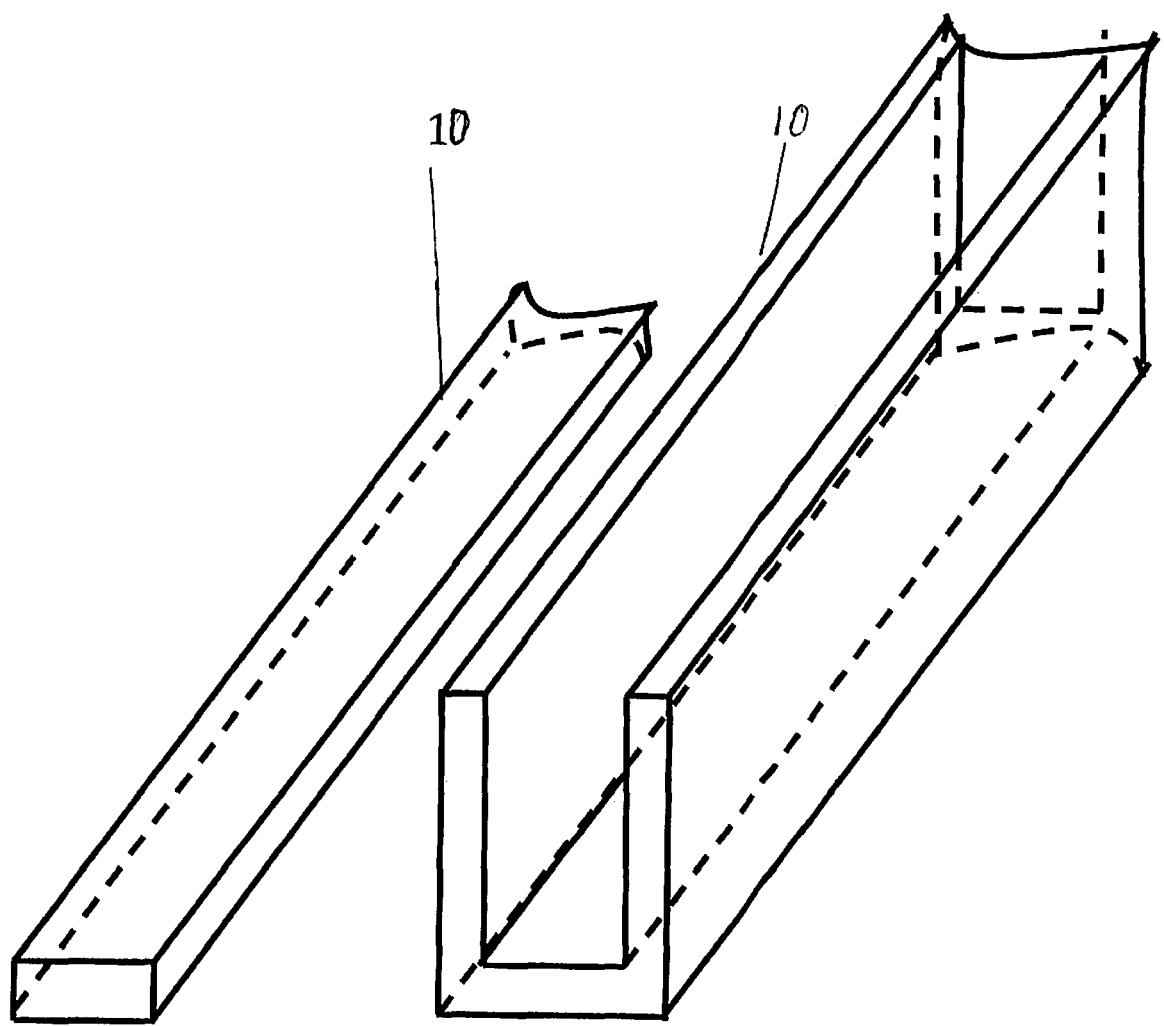

FIG. 9 an exemplary structural implementation of the sensor carrier module of the inventive modular sensor system in perspective view, here in flat implementation (left) and in U-shaped implementation (right).

Figure 10:
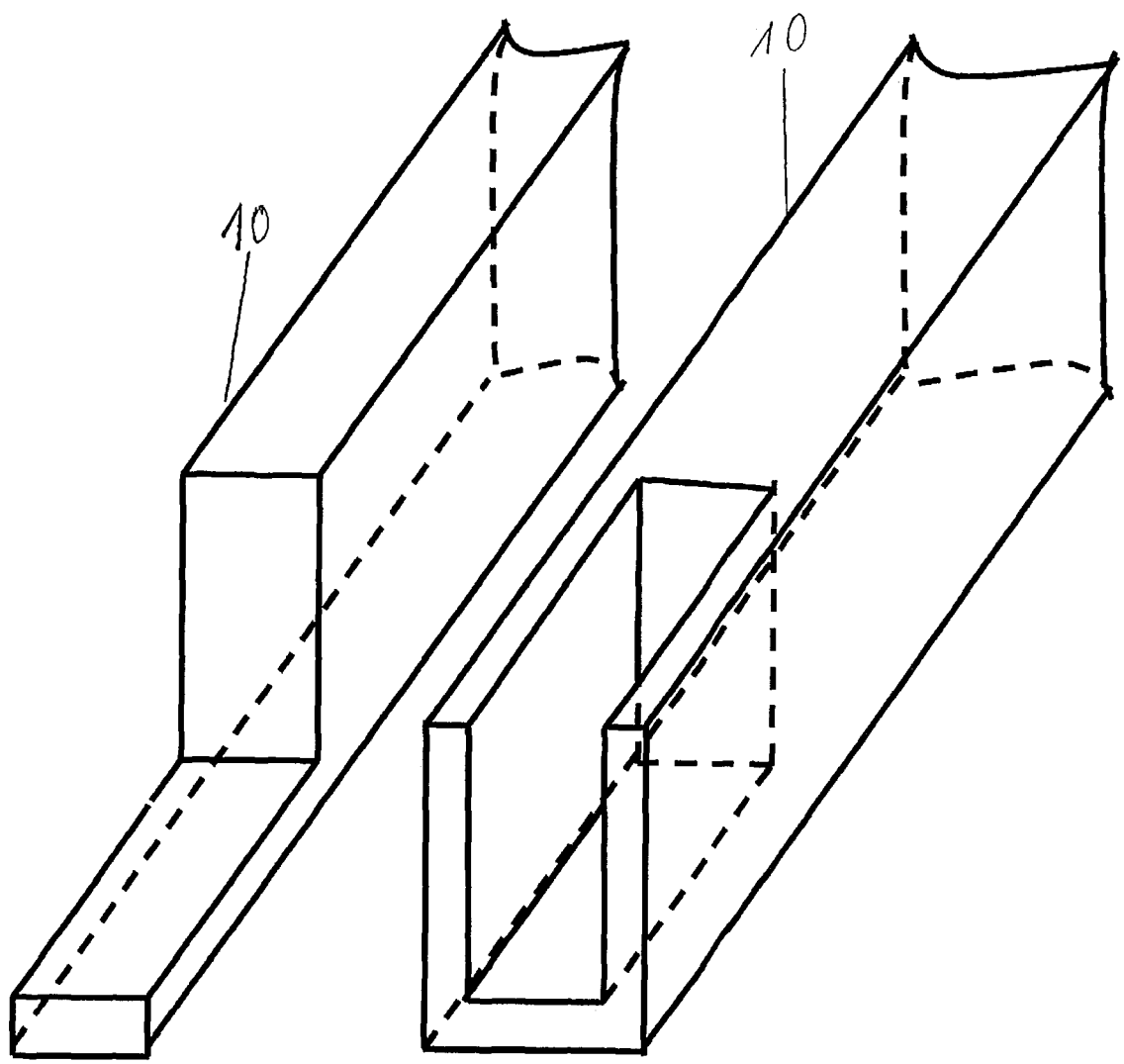

FIG. 10 an exemplary structural implementation of the sensor carrier module of the inventive modular sensor system in perspective view, here in solid implementation with flat cut-out at a first distal end (left) and in solid implementation with U-shaped cavity at a first distal end (right).

Figure 11:
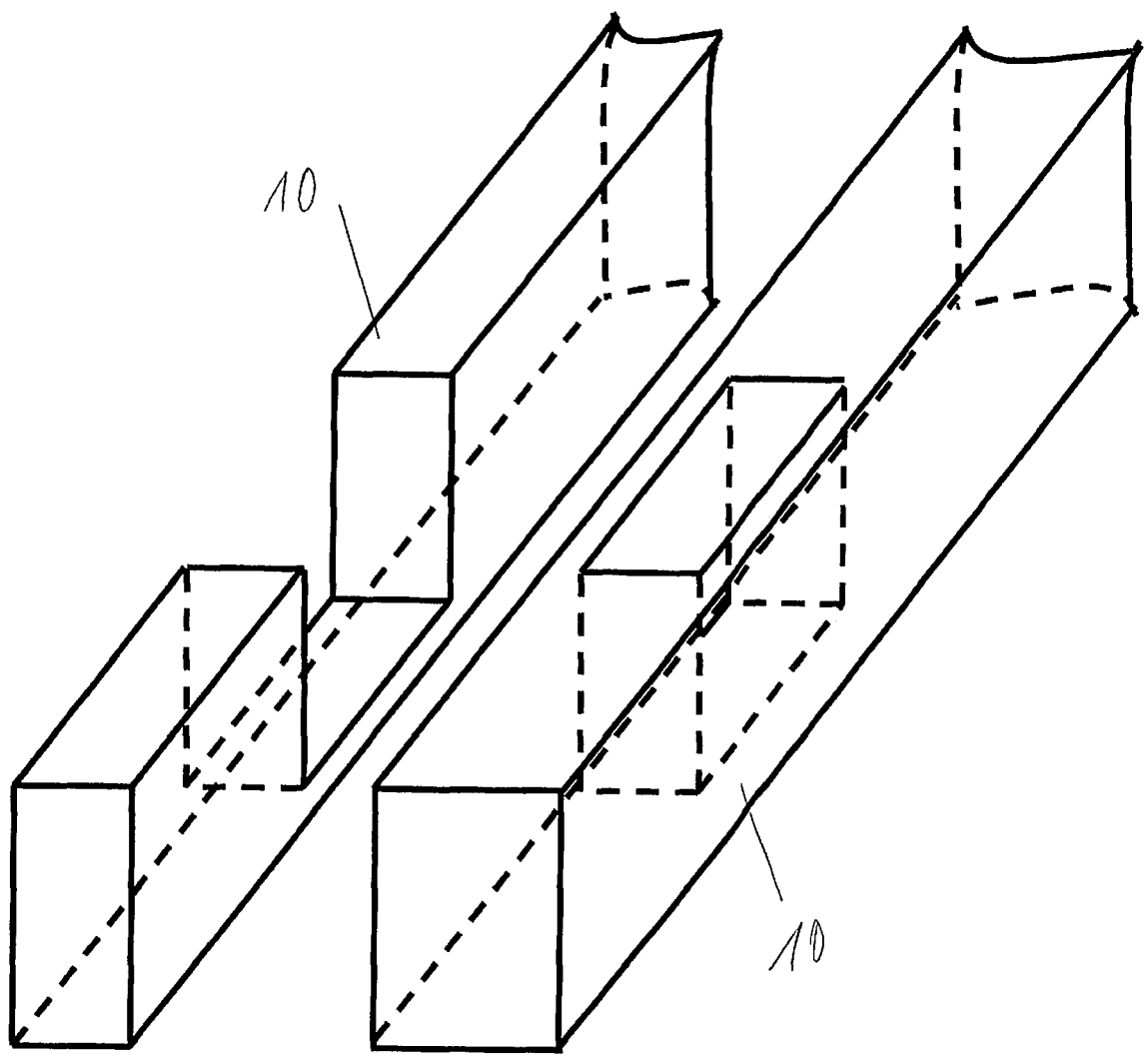

FIG. 11 an exemplary structural implementation of the sensor carrier module of the inventive modular sensor system in perspective view, here in solid implementation with flat cut-out within the sensor carrier (left) and in solid implementation with U-shaped cavity within the sensor carrier (right).

Figure 12:
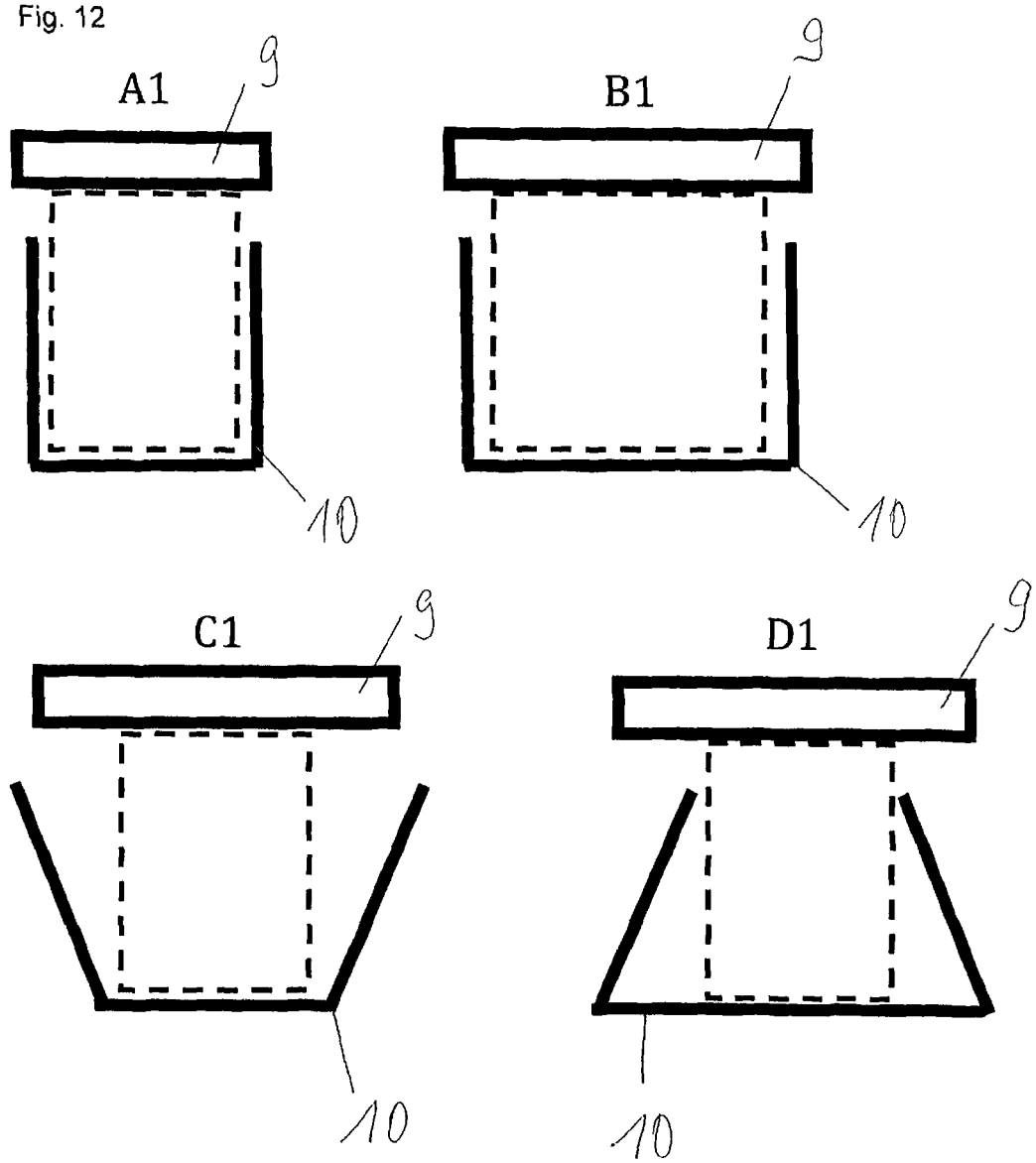

FIG. 12 a further exemplary structural implementation of the inventive modular sensor system in sectional transverse view with square U-shaped sensor carrier and flat pressure distribution strip as A1, with rectangular U-shaped sensor carrier and flat pressure distribution strip as B1, with open trapezoidal sensor carrier and flat pressure distribution strip as C1, with closed trapezoidal sensor carrier and flat pressure distribution strip as D1.

Figure 13:
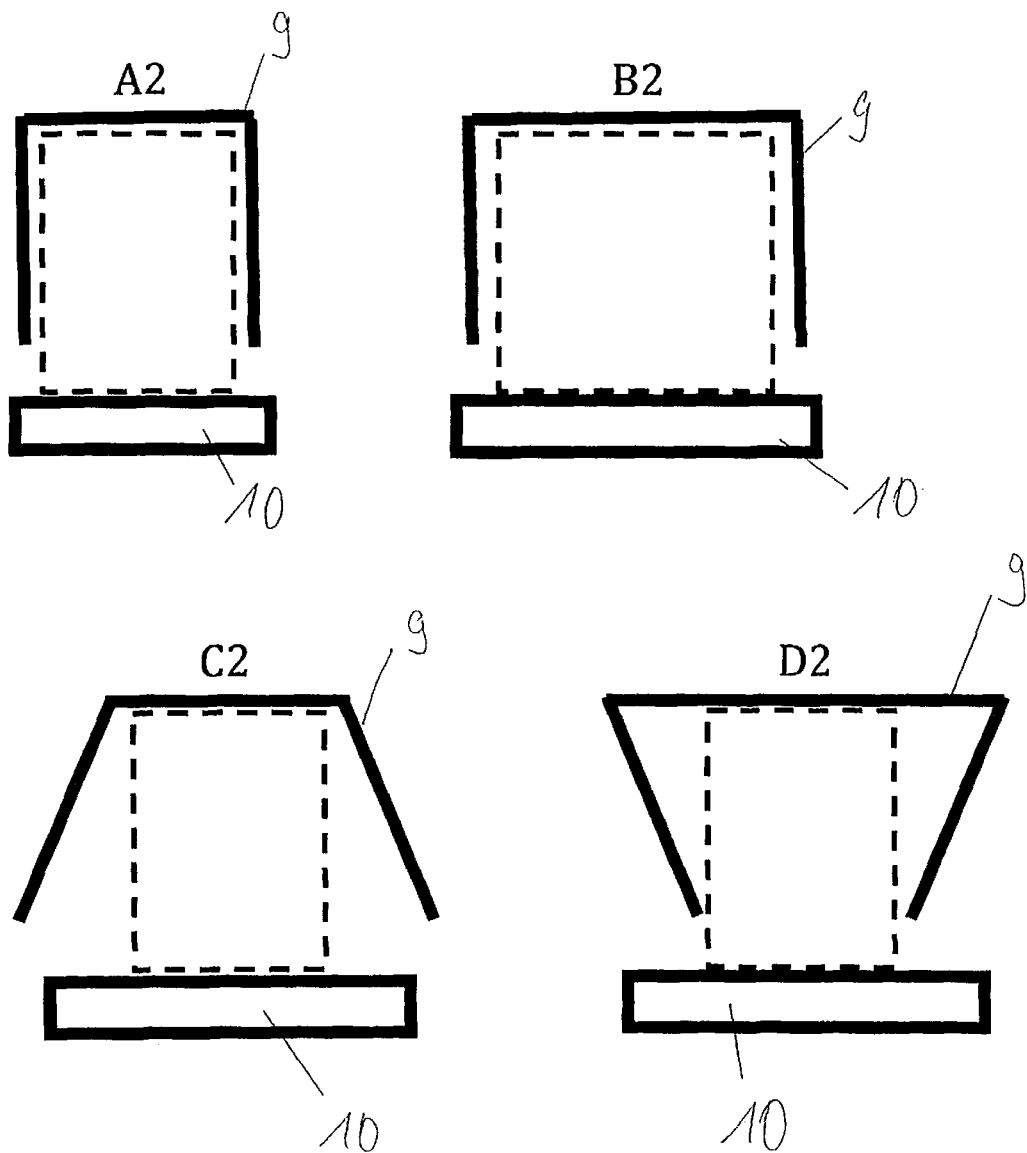

FIG. 13 a further exemplary structural implementation of the inventive modular sensor system in sectional transverse view with flat sensor carrier and square U-shaped pressure distribution strip as A2, with flat sensor carrier and rectangular U-shaped pressure distribution strip as B2, with flat sensor carrier and open trapezoidal pressure distribution strip as C2, with flat sensor carrier and closed trapezoidal pressure distribution strip as D2.

Figure 14:
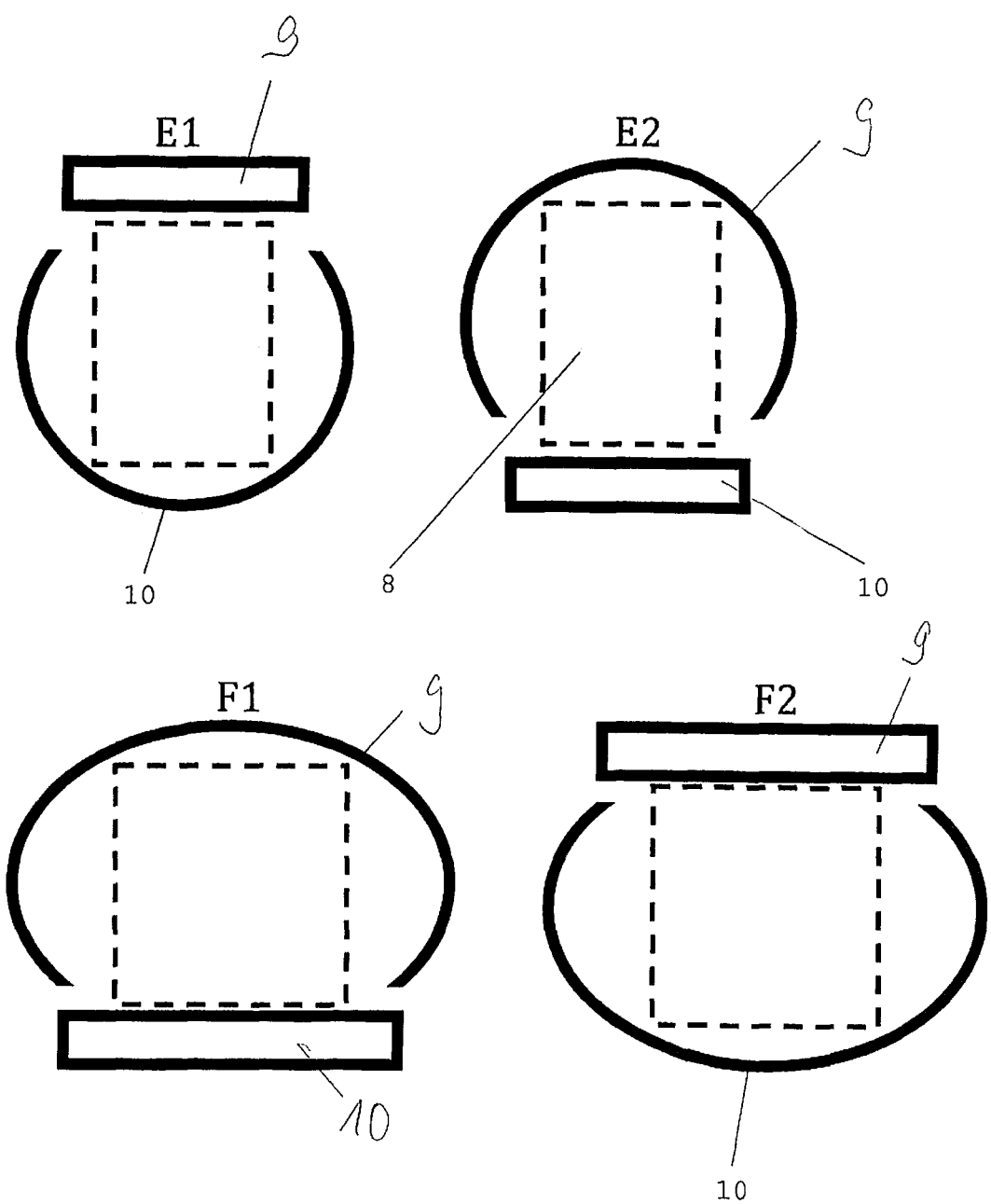

FIG. 14 a further exemplary structural implementation of the inventive modular sensor system in sectional transverse view with round tubular sensor carrier and flat pressure distribution strip as E1, with flat sensor carrier and round tubular pressure distribution strip as E2, with flat sensor carrier and oval tubular pressure distribution strip as F1, with oval tubular sensor carrier and flat pressure distribution strip as F2.

Figure 15:
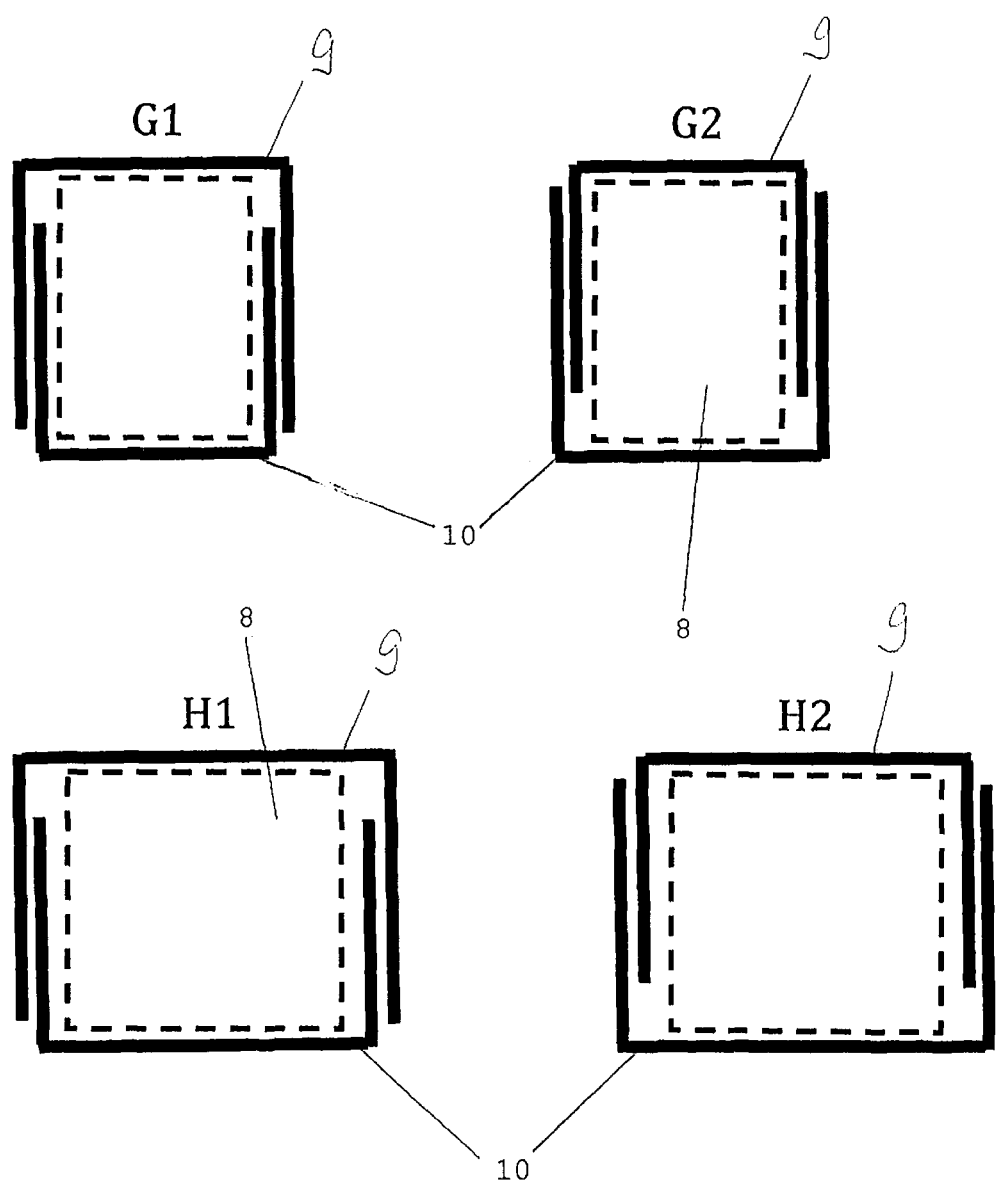

FIG. 15 a further exemplary structural implementation of the inventive modular sensor system in sectional transverse view with square U-shaped—inner—sensor carrier and square U-shaped pressure distribution strip as G1, with square U-shaped—outer—sensor carrier and square U-shaped pressure distribution strip as G2, with rectangular U-shaped—inner—sensor carrier and rectangular U-shaped pressure distribution strip as H1, with rectangular U-shaped—outer—sensor carrier and rectangular U-shaped pressure distribution strip as H2.

Figure 16:
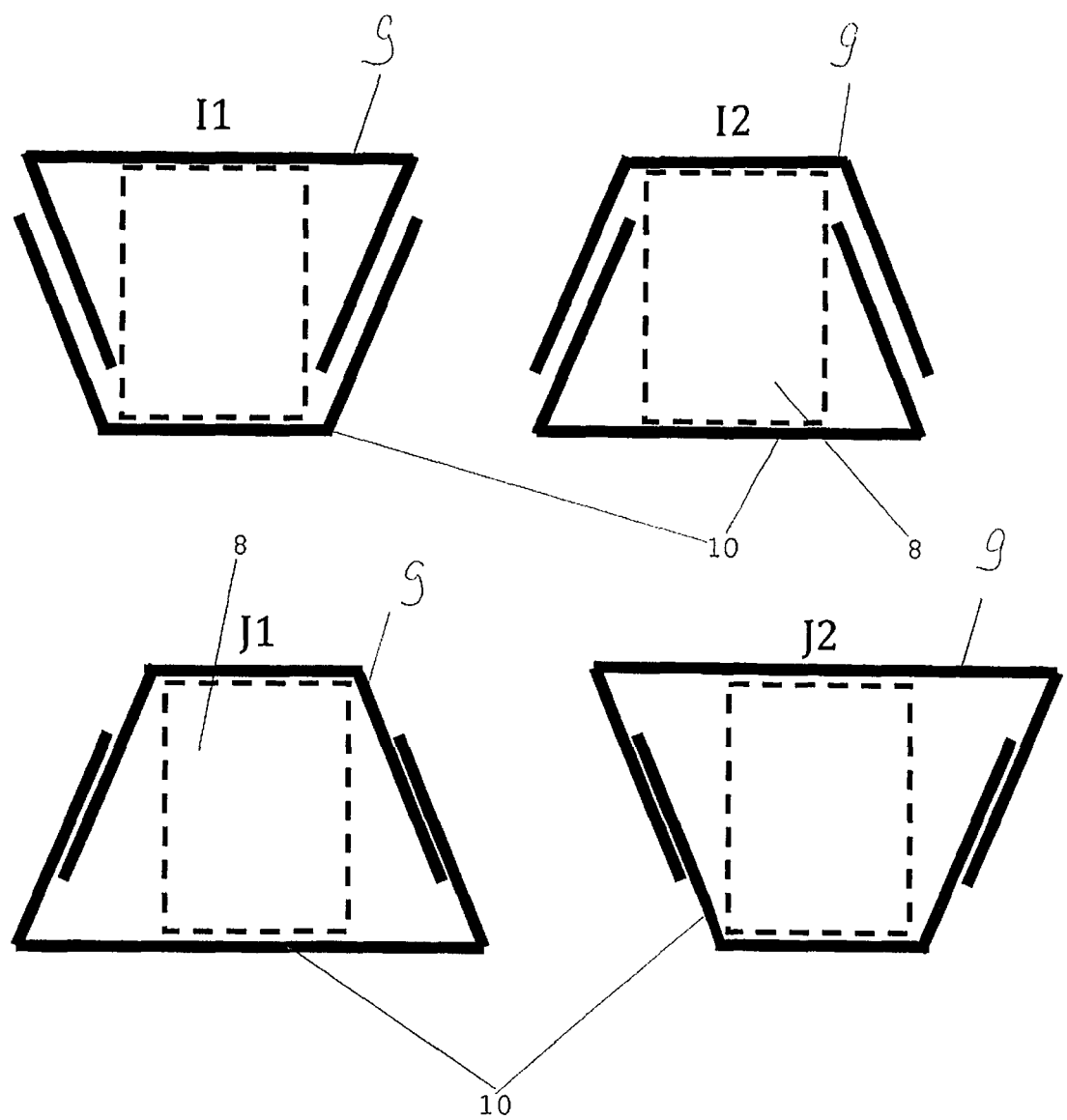

FIG. 16 a further exemplary structural implementation of the inventive modular sensor system in sectional transverse view with open trapezoidal—outer—sensor carrier and closed trapezoidal pressure distribution strip as I1, with closed trapezoidal—inner—sensor carrier and open trapezoidal pressure distribution strip as I2, with closed trapezoidal—outer—sensor carrier and open trapezoidal pressure distribution strip as J1, with open trapezoidal—inner—sensor carrier and closed trapezoidal pressure distribution strip as J2.

Figure 17:
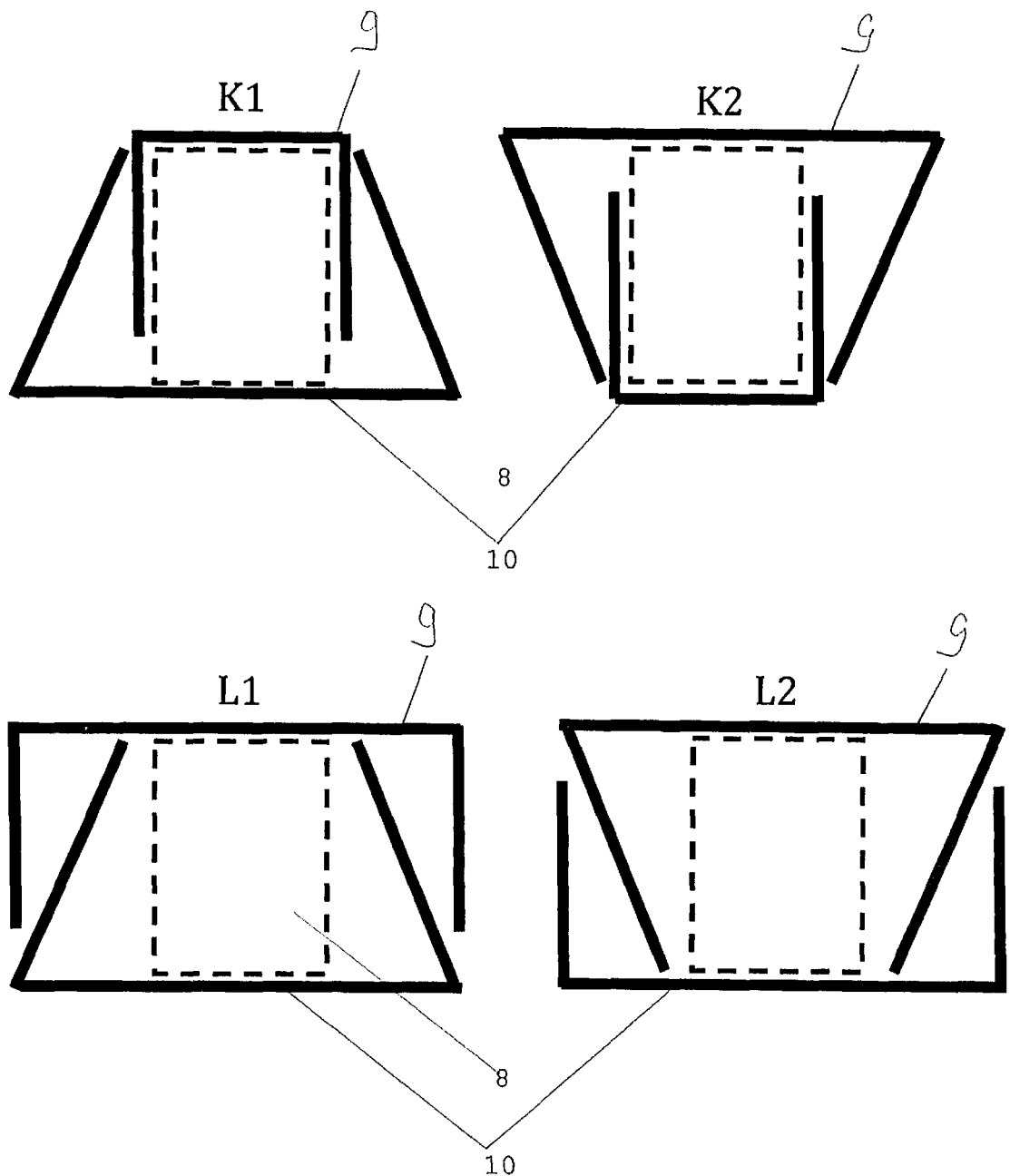

FIG. 17 a further exemplary structural implementation of the inventive modular sensor system in sectional transverse view with closed trapezoidal—outer—sensor carrier and square U-shaped pressure distribution strip as K1, with square U-shaped—inner—sensor carrier and closed trapezoidal pressure distribution strip as K2, with closed trapezoidal—inner—sensor carrier and rectangular U-shaped pressure distribution strip as L1, with rectangular U-shaped—outer—sensor carrier and closed trapezoidal pressure distribution strip as L2.

Figure 18:
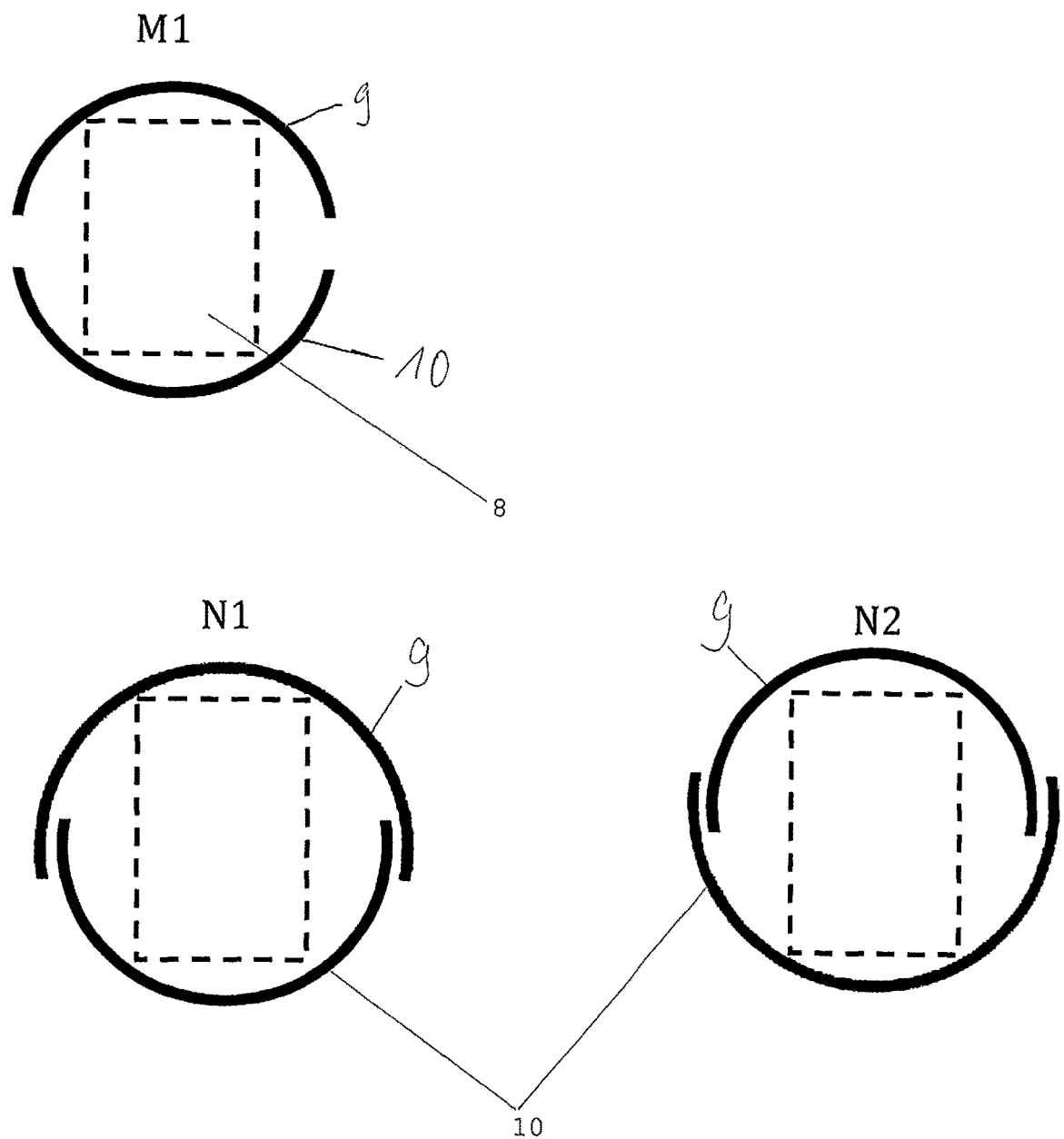

FIG. 18 a further exemplary structural implementation of the inventive modular sensor system in sectional transverse view with half-round tubular—flush—sensor carrier and half-round tubular pressure distribution strip as M1, with half-round tubular—inner—sensor carrier and half-round tubular pressure distribution strip as N1, with half-round tubular—outer—sensor carrier and half-round pressure distribution strip as N2.

FIG. 19 a further exemplary structural implementation of the inventive modular sensor system in sectional transverse view with half-oval tubular—flush—sensor carrier and half-oval tubular pressure distribution strip as O1, with half-oval tubular—inner—sensor carrier and half-oval tubular pressure distribution strip as P1, with half-oval tubular—outer—sensor carrier and half-oval tubular pressure distribution strip as P2.

Figure 20:
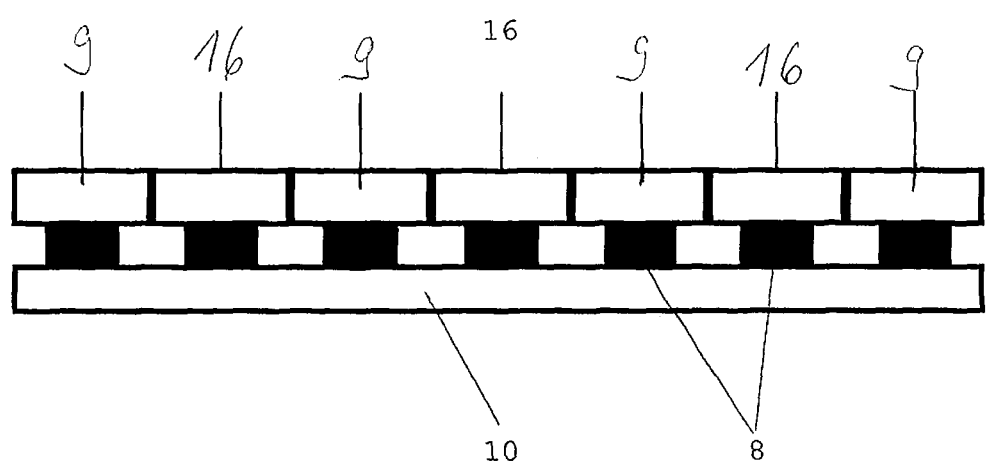

FIG. 20 a fifth exemplary structural implementation of the inventive modular sensor system in sectional side view.

Figure 21:
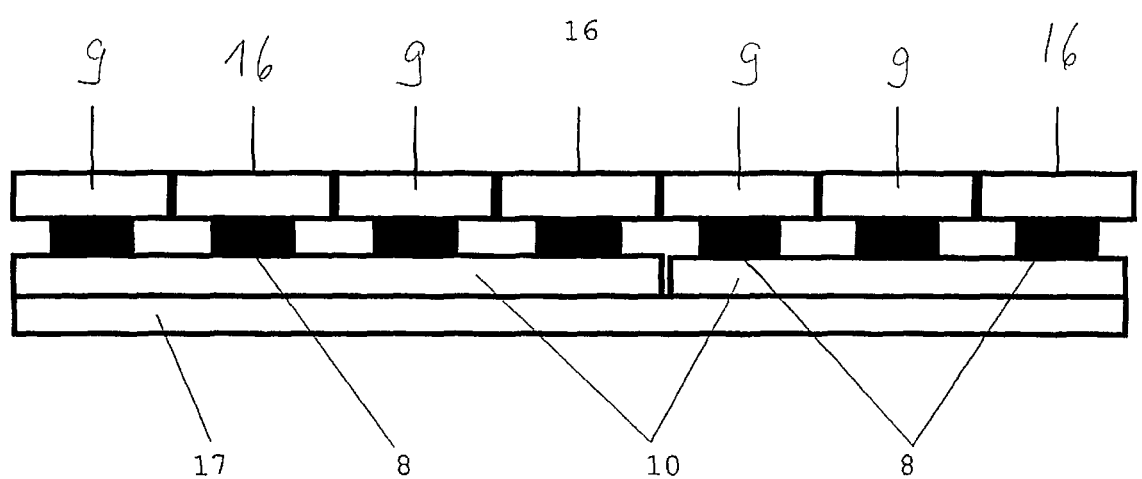

FIG. 21 a sixth exemplary structural implementation of the inventive modular sensor system in sectional side view.

Figure 22:
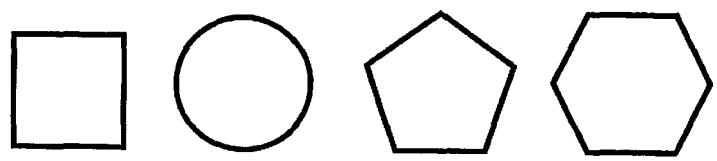

FIG. 22 an exemplary structural implementation of the measuring/sensor points of the weight distribution strip module of the inventive modular sensor system in top view.

Figure 23:
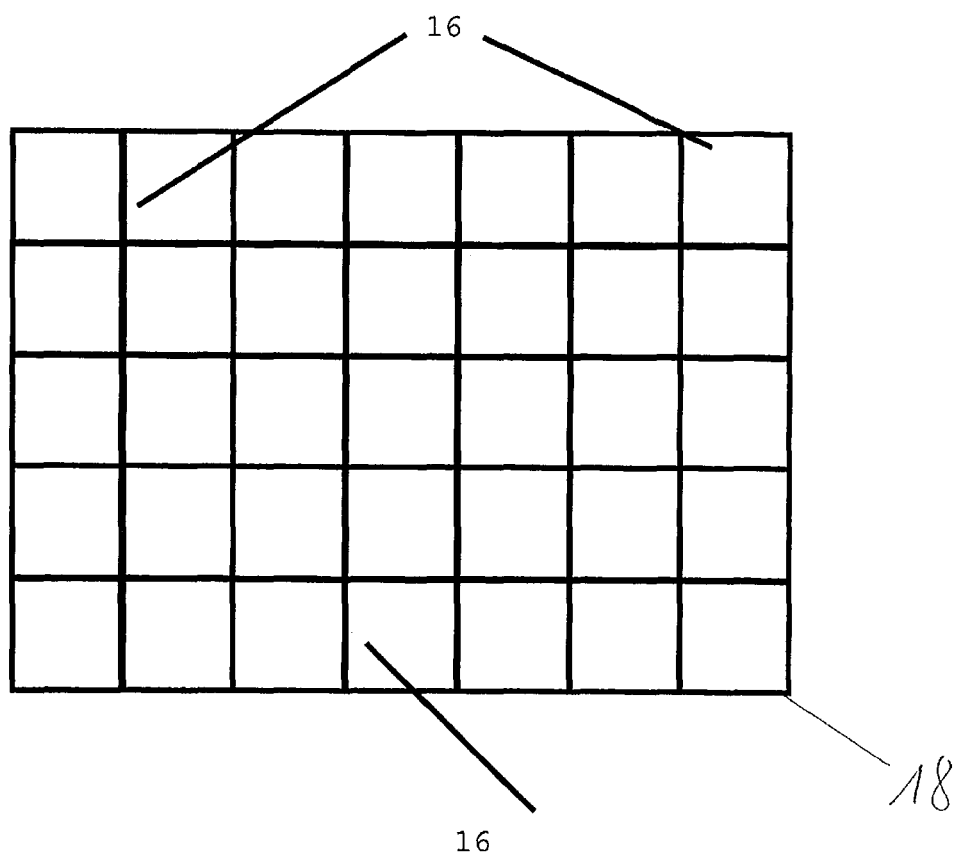

FIG. 23 an exemplary structural implementation of the measuring/sensor points of the weight distribution strip module of the inventive modular sensor system as surface elements arranged vertically and horizontally in top view.

Figure 24:
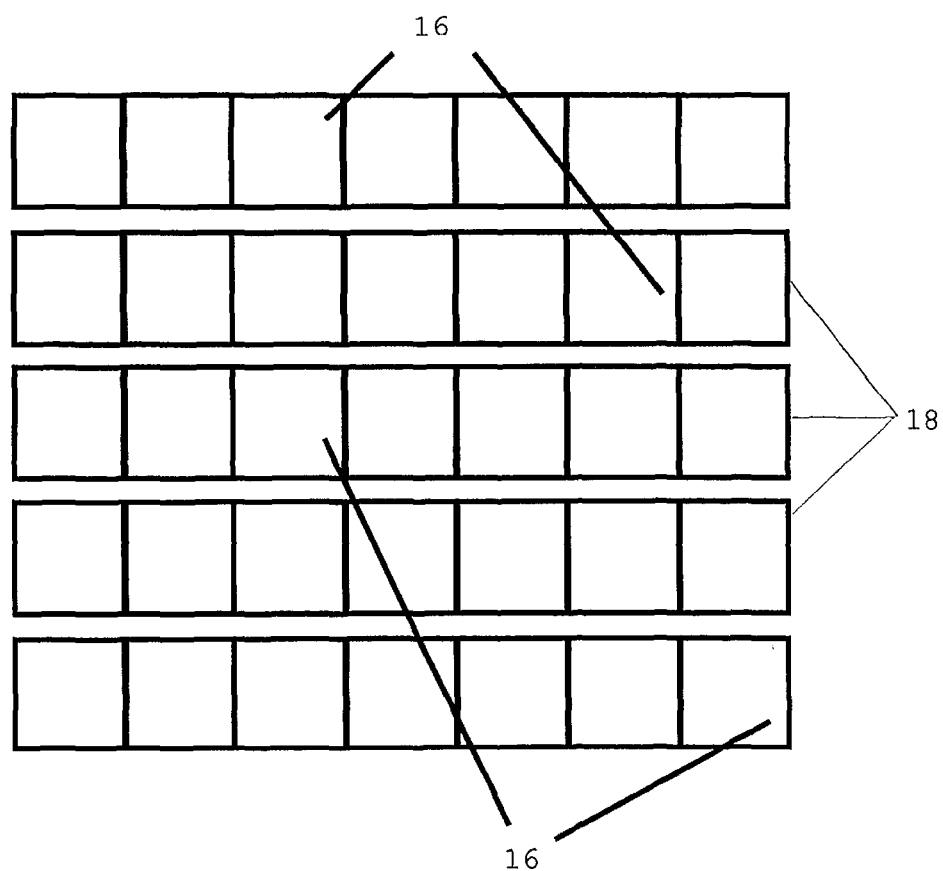

FIG. 24 an exemplary structural implementation of the measuring/sensor points of the weight distribution strip module of the inventive modular sensor system as surface elements arranged in strips in top view.

Figure 25:
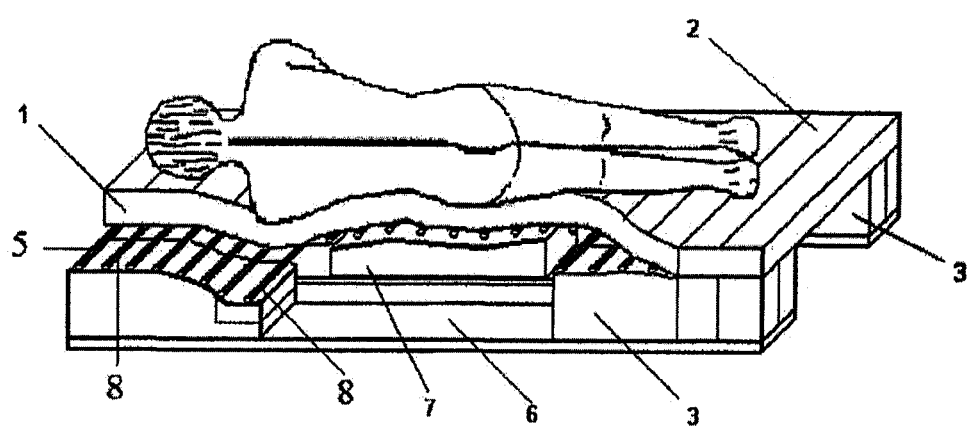

FIG. 25 structure of a prior art slatted frame mattress

Figure 26:
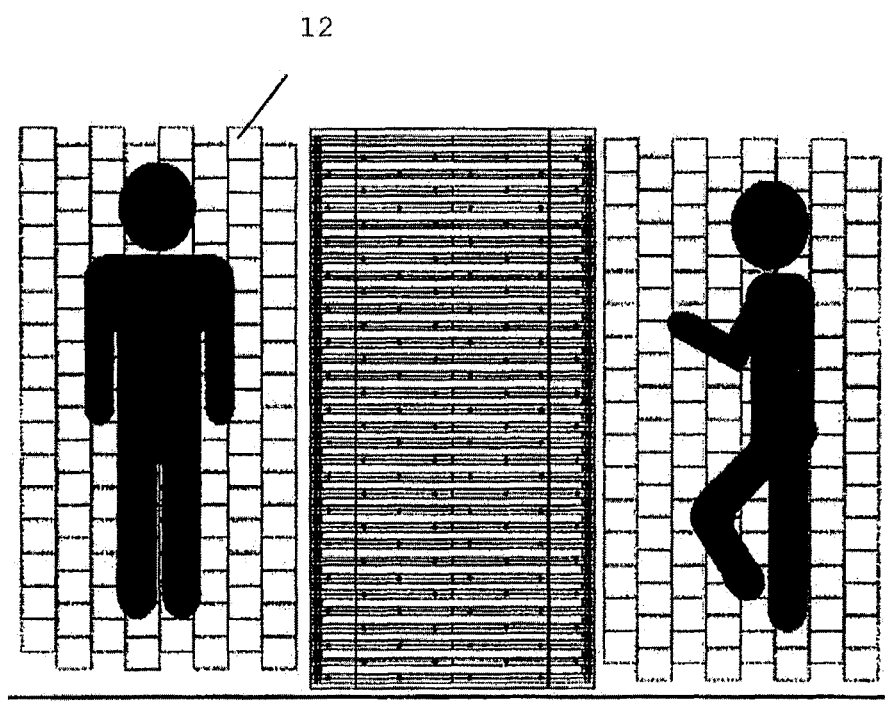

FIG. 26 exemplary resting positions on a prior art slatted frame mattress

In detail, the figures specifically show:

FIG. 1 a first exemplary structural implementation of the inventive modular sensor system in sectional side view with one weight distribution strip 9 and one sensor carrier 10 with two sensors 8 coupled directly to the weight distribution strip 9 shown between them.

FIG. 2 a second exemplary structural implementation of the inventive modular sensor system in sectional side view with one weight distribution strip 9 and one sensor carrier 10 with one sensor 8 coupled directly to the weight distribution strip 9 shown between them. A fixation point 11 which connects the two modules together is arranged at the respective distal ends of the weight distribution strip 9 and sensor carrier 10.

FIG. 3 a third exemplary structural implementation of the inventive modular sensor system in sectional side view with two weight distribution strips 9 and one sensor carrier 10 with two sensors 8 in each case coupled directly to the respective weight distribution strip 9 shown between them. It is of course also possible to affix more than two weight distribution strips 9 to one sensor carrier 10 having two or even more respective sensors 8.

FIG. 4 a fourth exemplary structural implementation of the inventive modular sensor system in sectional side view with two weight distribution strips 9 and two sensor carriers 10 with two sensors 8 in each case coupled directly to the respective weight distribution strip 9 shown between them, the respective sensor carriers 10 thereby resting on a support element 17. It is of course also possible to affix more than two weight distribution strips 9 to a respective sensor carrier 10 respectively having two or even more respective sensors 8 and resting on a support element 17.

FIG. 5 a first exemplary structural implementation of the inventive modular sensor system in sectional side view as per FIG. 1 with coupled smart beacon device (SBD) 13. The respective connection 14 is a wired and/or wireless connection.

FIG. 6 a second exemplary structural implementation of the inventive modular sensor system in sectional side view as per FIG. 2 with coupled smart beacon device (SBD) 13 and an internal power supply 15. The respective connection 14 is a wired and/or wireless/inductive connection.

FIG. 7 a third exemplary structural implementation of the inventive modular sensor system in sectional side view as per FIG. 3 with respectively coupled smart beacon devices (SBD) 13 and an internal power supply 15. The respective connection 14 is a wired and/or wireless/inductive connection.

FIG. 8 a fourth exemplary structural implementation of the inventive modular sensor system in sectional side view as per FIG. 4 with respectively coupled smart beacon devices (SBD) 13 and an external power supply 15. The respective connection 14 is a wired and/or wireless/inductive connection.

FIG. 9 an exemplary structural implementation of the sensor carrier 10 module of the inventive modular sensor system in perspective view, here in flat implementation (left) and in U-shaped implementation (right).

FIG. 10 an exemplary structural implementation of the sensor carrier 10 module of the inventive modular sensor system in perspective view, here in solid implementation with flat cut-out at a first distal end (left) and in solid implementation with U-shaped cavity at a first distal end (right).

FIG. 11 an exemplary structural implementation of the sensor carrier 10 module of the inventive modular sensor system in perspective view, here in solid implementation with flat cut-out within the sensor carrier (left) and in solid implementation with U-shaped cavity within the sensor carrier 10 (right).

FIG. 12 a further exemplary structural implementation of the sensor carrier 10 module of the inventive modular sensor system in sectional transverse view with square U-shaped sensor carrier 10 and flat pressure/weight distribution strip 9 as A1, with rectangular U-shaped sensor carrier 10 and flat pressure/weight distribution strip 9 as B1, with open trapezoidal sensor carrier 10 and flat pressure/weight distribution strip 9 as C1, with closed trapezoidal sensor carrier 10 and flat pressure/weight distribution strip 9 as D1.

The dotted area in FIGS. 12 to 19 indicate the area for the sensor system of sensor 8, connection 14, SBD 13 and power supply 15 or the like.

FIG. 13 a further exemplary structural implementation of the inventive modular sensor system in sectional transverse view with flat sensor carrier 10 and square U-shaped pressure/weight distribution strip 9 as A2, with flat sensor carrier 10 and rectangular U-shaped pressure/weight distribution strip 9 as B2, with flat sensor carrier 10 and open trapezoidal pressure/weight distribution strip 9 as C2, with flat sensor carrier 10 and closed trapezoidal pressure/weight distribution strip 9 as D2.

FIG. 14 a further exemplary structural implementation of the inventive modular sensor system in sectional transverse view with round tubular sensor carrier 10 and flat pressure/weight distribution strip 9 as E1, with flat sensor carrier 10 and round tubular pressure/weight distribution strip 9 as E2, with oval tubular pressure/weight distribution strip 9 and flat sensor carrier 10 as F1, with flat pressure/weight distribution strip 9 and oval tubular sensor carrier 10 as F2.

FIG. 15 a further exemplary structural implementation of the inventive modular sensor system in sectional transverse view with square U-shaped—inner—sensor carrier 10 and square U-shaped pressure/weight distribution strip 9 as G1, with square U-shaped—outer—sensor carrier 10 and square U-shaped pressure/weight distribution strip 9 as G2, with rectangular U-shaped—inner—sensor carrier 10 and rectangular U-shaped pressure/weight distribution strip 9 as H1, with rectangular U-shaped—outer—sensor carrier 10 and rectangular U-shaped pressure/weight distribution strip 9 as H2.

FIG. 16 a further exemplary structural implementation of the inventive modular sensor system in sectional transverse view with open trapezoidal—outer—sensor carrier 10 and closed trapezoidal pressure/weight distribution strip 9 as I1, with closed trapezoidal—inner—sensor carrier 10 and open trapezoidal pressure/weight distribution strip 9 as I2, with closed trapezoidal—outer—sensor carrier 10 and open trapezoidal pressure/weight distribution strip 9 as J1, with open trapezoidal—inner—sensor carrier 10 and closed trapezoidal pressure/weight distribution strip 9 as J2.

FIG. 17 a further exemplary structural implementation of the inventive modular sensor system in sectional transverse view with closed trapezoidal—outer—sensor carrier 10 and square U-shaped pressure/weight distribution strip 9 as K1, with square U-shaped—inner—sensor carrier 10 and closed trapezoidal pressure/weight distribution strip 9 as K2, with closed trapezoidal—inner—sensor carrier 10 and rectangular U-shaped pressure/weight distribution strip 9 as L1, with rectangular U-shaped—outer—sensor carrier 10 and closed trapezoidal pressure/weight distribution strip 9 as L2.

FIG. 18 a further exemplary structural implementation of the inventive modular sensor system in sectional transverse view with half-round tubular—flush—sensor carrier 10 and half-round tubular pressure/weight distribution strip 9 as M1, with half-round tubular—inner—sensor carrier 10 and half-round tubular pressure/weight distribution strip 9 as N1, with half-round tubular—outer—sensor carrier 10 and half-round pressure/weight distribution strip 9 as N2.

FIG. 19 a further exemplary structural implementation of the inventive modular sensor system in sectional transverse view with half-oval tubular—flush—sensor carrier 10 and half-oval tubular pressure/weight distribution strip 9 as O1, with half-oval tubular—inner—sensor carrier 10 and half-oval tubular pressure/weight distribution strip 9 as P1, with half-oval tubular—outer—sensor carrier 10 and half-oval tubular pressure/weight distribution strip 9 as P2.

FIG. 20 a fifth exemplary structural implementation of the inventive modular sensor system in sectional side view with one respective weight distribution strip 9 for each sensor 8 shown on a sensor carrier 10, wherein the respective sensor 8 is directly coupled to the respective weight distribution strip 9.

FIG. 21 a sixth exemplary structural implementation of the inventive modular sensor system in sectional side view with one respective weight distribution strip 9 for each sensor 8 shown on two sensor carriers 10, wherein the respective sensor 8 is directly coupled to the respective weight distribution strip 9 and the sensor carriers rest on a support element 17.

FIG. 22 an exemplary structural implementation of the measuring/sensor points 16 of the weight distribution strip 9 module of the inventive modular sensor system in top view. The sensor-relevant sensing element or respectively measuring point 16 is thereby coupled or respectively realized or integrated on, in and/or by the respective weight distribution strip 9.

FIG. 23 an exemplary structural implementation of the measuring/sensor points of the weight distribution strip 9 module of the inventive modular sensor system as surface elements 18 with respective measuring/sensor points 16 arranged vertically and horizontally in top view.

FIG. 24 an exemplary structural implementation of the measuring/sensor points of the weight distribution strip 9 module of the inventive modular sensor system as surface elements 18 with respective measuring/sensor points 16 arranged in strips in top view.

FIG. 25 the structure of a prior art slatted frame mattress. The slatted frame 5 consisting of individual slats resting on longitudinal lateral pedestals 3 affords body-hugging support to the person lying atop the flexible overlay 1 with mattress ticking 2. The longitudinal lateral pedestals 3 lie on two supports which form the base frame 6. A centrally fitted pelvic cushion 7 supports the suspension and is individually adaptable. Sensors 8 are positioned on the slats in the prior art.

FIG. 26 exemplary resting positions on a prior art slatted frame mattress with pressure area 12 distribution.

LIST OF REFERENCE NUMERALS 1 flexible overlay
2 mattress ticking
3 longitudinal pedestal
4 shoulder lowering elements
5 slatted frame
6 base frame
7 pelvic cushion
8 sensor
9 weight distribution strip
10 sensor carrier
11 fixation point
12 pressure area
13 smart beacon device (SBD)
14 connection
15 power supply
16 measuring/sensor point
17 support element
18 surface element

The invention claimed is:

1. A modular sensor system of at least three modules having at least one sensor, at least one sensor carrier, and at least one weight distribution strip which can be connected to each other in a sandwich-like manner, wherein the at least one sensor is configured to be arranged between the at least one sensor carrier and the at least one weight distribution strip, and wherein the at least one sensor is arranged to measure at least one of weight and/or acceleration, wherein the modular sensor system is configured to be used in a slatted frame or a slatted frame mattress having a plurality of slats, wherein the modular sensor system is configured to replace a slat of the slatted frame or the slatted frame mattress.

2. The modular sensor system according to claim 1, wherein the at least one sensor, the at least one sensor carrier, and the at least one weight distribution strip can be connected to each other in a sandwich-like manner in one plane.

3. The modular sensor system according to claim 1, wherein the at least one sensor incorporates or exhibits a weight sensor and at least one of a temperature sensor, a moisture sensor, an acceleration sensor, and a spatial positioning sensor.

4. The modular sensor system according to claim 1, wherein the at least one sensor carrier can be coupled to the at least one weight distribution strip.

5. The modular sensor system according to claim 1, wherein the at least one weight distribution strip can be coupled to the at least one sensor carrier.

6. The modular sensor system according to claim 1, wherein the modular sensor system with its respective sensors can be coupled to at least one smart beacon device.

7. The modular sensor system according to claim 6, wherein the at least one smart beacon device can be structurally integrated into the respective modular sensor system.

8. The modular sensor system according claim 1, wherein the modular sensor system with its respective sensors can be coupled to at least one wireless module with ultra-wideband, WLAN, or Bluetooth having suitable frequencies for determining position.

9. The modular sensor system according to claim 8, wherein the modular sensor system with its respective sensors can be structurally integrated into the at least one wireless module with ultra-wideband, WLAN, or Bluetooth having suitable frequencies for determining the position in the respective modular sensor system.

10. The modular sensor system according to claim 1, wherein the at least one sensor of the modular sensor system can be structurally integrated with at least one wireless module with ultra-wideband, WLAN, or Bluetooth having suitable frequencies for determining position.

11. The use of the modular sensor system according to claim 1 in the slatted frame mattress.

12. The slatted frame mattress having a modular sensor system according to claim 1.

13. The modular sensor system according to claim 1, wherein the modular sensor system is arranged to perform at least one of weight measurements and acceleration measurements as at least one of a point measurement, a linear measurement, or an area measurement.

14. The modular sensor system according to claim 1, wherein the modular sensor system is arranged to perform measurements at least one of in situ, sequentially, and continuously.

15. The slatted frame for use with a mattress, wherein the slatted frame has a modular sensor system according to claim 1.

* * * * *